United States Patent Office 3,679,662
Patented July 25, 1972

3,679,662
TETRAHYDROCYCLOPROPADIBENZAZEPINE DERIVATIVES
Katsura Morita and Kenya Kawashima, Osaka, Japan, assignors to Takeda Chemical Industries, Ltd., Osaka, Japan
No Drawing. Filed June 9, 1970, Ser. No. 44,895
Claims priority, application Japan, June 20, 1969, 44/48,750, 44/48,751; Mar. 3, 1970, 45/18,103; Apr. 27, 1970, 45/36,176
Int. Cl. C07d *41/08, 57/00, 99/04*
U.S. Cl. 260—239 D          8 Claims

ABSTRACT OF THE DISCLOSURE

Novel compounds of the general formula

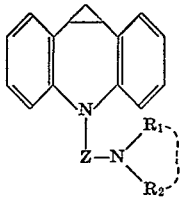

(wherein Z stands for a lower alkylene or a carbonyl group, each $R_1$ and $R_2$ stands for hydrogen atom, an alkyl group, or an aryl group, and $R_1$ and $R_2$ may form with the adjacent nitrogen atom a heterocyclic group) or its pharmaceutically acceptable salts, are prepared by reacting

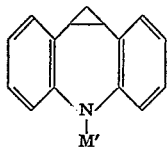

with a compound of the general formula

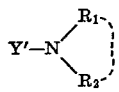

[wherein $R_1$ and $R_2$ have the same meaning as above, and one of M' and Y' is hydrogen atom and the other is a radical of Y—Z (wherein Y stands for a halogen atom and Z has the same meaning as above)], and if desired, converting the resultant to pharmaceutically acceptable salts. The novel compounds are useful as psychotropic drugs such as antidepressants, major tranquilizers, anti-Parkinson agents, antihistaminic agents, anticonvulsants and antiepileptics.

---

The present invention relates to novel dibenzazepine derivatives having a unique ring system and their pharmaceutically acceptable salts, which have effective psychotropic actions.

The present invention also relates to intermediates for these derivatives. The present invention further relates to a process for the production of these dibenzazepine derivatives and their intermediates.

The present inventors have made extensive studies on dibenzazepine derivatives to succeed in synthesizing novel tetrahydrocyclopropadibenzazepine derivatives which have a novel and unique ring system, and further found out that these novel compounds have effective psychotropic actions.

The present invention has been accomplished on the basis of these findings.

Thus, the principal object of the present invention is to provide novel compounds and their pharmaceutically acceptable salts useful as psychotropic drugs.

Another object is to provide intermediates for these novel compounds. Still another object is to provide a method for the production of these novel compounds and their intermediates.

The object compounds of the present invention are those represented by the following general formula

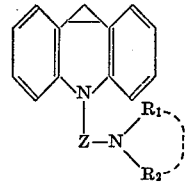

(wherein Z stands for a lower alkylene or a carbonyl group, each of $R_1$ and $R_2$ stands for a hydrogen atom, an alkyl group or an aryl group, and $R_1$ and $R_2$ may form with the adjacent nitrogen atom a heterocyclic group) or their pharmaceutically acceptable salts.

The tetrahydrocyclopropadibenzazepine structure of the above general Formula I is quite a novel and unique ring system.

The present compounds of the general Formula I having a novel and unique ring system and their pharmaceutically acceptable salts have strong and wide psychotropic actions. Stated in more detail, the compounds of the general Formula I wherein Z is an alkylene have antidepressive, anti-Parkinsonian, major-tranquilizing and antihistaminic actions, and those wherein Z is a carbonyl group have anticonvulsant, antiepileptic actions. Therefore, the present compounds can be used as psychotropic drugs such as an antidepressant, a major-transquilizer, an anti-Parkinsonian agent, an antihistaminic agent, an anticonvulsant, and an antiepileptic.

In the general Formula I, the lower alkylene represented by symbol Z may generally have 1 to 4 carbon atoms. Typical examples are methylene, methylmethylene, ethylene, propylene, isopropylene, butylene and isobutylene, among which alkylenes having 2 to 3 carbon atoms, i.e. ethylene and propylene, are the most desirable.

As the alkyl group represented by the symbols $R_1$ and $R_2$, those having 1 to 4 carbon atoms such as methyl, ethyl, propyl, isopropyl, butyl, sec.-butyl, and ter.-butyl are generally desirable.

The aryl group represented by the symbols $R_1$ and $R_2$ includes, for instance, phenyl, naphthyl, tolyl, etc.

The heterocyclic group formed by the groups $R_1$ and $R_2$ with the adjacent nitrogen atom includes, for instance, 1-pyrrolidinyl, 1-piperidyl, morpholino, 1-piperazinyl group, etc. and these heterocyclic groups may be substituted by one or more lower alkyl or lower hydroxyalkyl groups such as methyl, ethyl, hydroxymethyl and hydroxyethyl.

The pharmaceutically acceptable salts of the present compounds include addition salts with inorganic acids such as hydrochloric acid, sulfuric acid, nitric acid, and phosphoric acid, and organic acids such as oxalic acid, maleic acid, malic acid, tartaric acid, salicyclic acid, methanesulfonic acid and ethanesulfonic acid.

Typical compounds represented by the general Formula I are exemplified as below:

6-(2-methylaminoethyl)-1,1a,6,10b-tetrahydrocyclopropa-[d]-dibenz[b,f]azepine 6-(2-dimethylaminoethyl)-1,1a,6,10b-tetrahydrocyclopropa[d]-dibenz[b,f]azepine.

6-(2-methylaminopropyl)-1,1a,6,10b-tetrahydrocyclopropa[d]-dibenz[b,f]azepine.

6-(3-methylaminopropyl)-1,1a,6,10b-tetrahydrocyclopropa[d]-dibenz[b,f]azepine.

6-(3-dimethylaminopropyl)-1,1a,6,10b-tetrahydrocyclopropa[d]-dibenz[b,f]azepine.

6-(2-methyl-3-methylaminopropyl)-1,1a,6,10b-tetra-
  hydrocyclopropa[d]dibenz[b,f]azepine
6-(3-dimethylamino-2-methylpropyl)-1,1a,6,10b-tetra-
  hydrocyclopropa[d]dibenz[b,f]azepine
6-(2-ethylaminoethyl)-1,1a,6,10b-tetrahydrocyclopropa-
  [d]dibenz[b,f]azepine
6-(2-diethylaminoethyl)-1,1a,6,10b-tetrahydrocyclo-
  propa[d]dibenz[b,f]azepine
6-(2-ethylaminopropyl)-1,1a,6,10b-tetrahydrocyclo-
  propa[d]dibenz[b,f]azepine
6-(2-diethylaminopropyl)-1,1a,6,10b-tetrahydrocyclo-
  propa[d]dibenz[b,f]azepine
6-(3-(1-piperidyl)propyl)-1,1a,6,10b-tetrahydrocyclo-
  propa[d]dibenz[b,f]azepine
6-(3-morpholinopropyl)-1,1a,6,10b-tetrahydrocyclo-
  propa[d]dibenz[b,f]azepine
6-(3-(1-pyrrolidinyl)propyl)-1,1a,6,10b-tetrahydrocyclo-
  propa[d]dibenz[b,f]azepine
6-(3-(1-piperazinyl)propyl)-1,1a,6,10b-tetrahydrocyclo-
  propa[d]dibenz[b,f]azepine
6-(3-(4-methyl-1-piperazinyl)propyl)-1,1a,6,10b-tetra-
  hydrocyclopropa[d]dibenz[b,f]azepine
6-(3-(4-(2-hydroxyethyl)-1-piperazinyl)propyl)-1,1a,6,10b-
  tetrahydrocyclopropa[d]dibenz[b,f]azepine
1,1a,6,10b-tetrahydrocyclopropa[d]dibenz[b,f]azepine-
  6-carboxamide
N-methyl-1,1a,6,10b-tetrahydrocyclopropa[d]dibenz-
  [b,f]azepine-6-carboxamide
N,N-dimethyl-1,1a,6,10b-tetrahydrocyclopropa[d]dibenz-
  [b,f]azepine-6-carboxamide
N-ethyl-1,1a,6,10b-tetrahydrocyclopropa[d]dibenz-
  [b,f]azepine-6-carboxamide
N,N-diethyl-1,1a,6,10b-tetrahydrocyclopropa[d]dibenz-
  [b,f]azepine-6-carboxamide and their pharmaceutically acceptable salts.

The present compounds of the general Formula I are prepared from the corresponding intermediates of the general Formula II

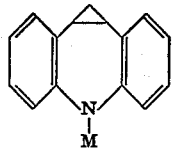
(II)

[wherein M is a hydrogen atom or a radical of Z—Y (wherein Z has the same meaning as above and Y is halogen including chlorine, bromine, etc.)]

Namely, the present compounds of the general Formula I can be prepared by the reaction of a compound of the general formula

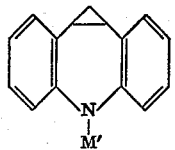
(II')

with a compound of the general formula

(II'')

[wherein $R_1$ and $R_2$ have the same meaning as above, and one of M' and Y' is a hydrogen atom and the other is a radical of Y—Z (wherein Y and Z have the same meaning as above)].

In other words, when a compound of the formula

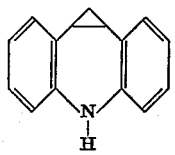
(III)

(i.e. a compound of the Formula II wherein M is H) is used as the starting material, the present compound of the general Formula I is prepared by reacting the compound of the Formula III with a compound of the general formula

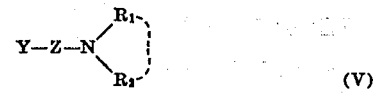
(V)

(wherein Y stands for a halogen atom, and Z, $R_1$ and $R_2$ have the same meaning as above), and when a compound of the general formula

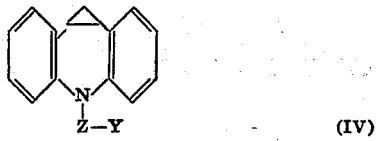
(IV)

[i.e. a compound of the general Formula II wherein M is a radical of Z—Y (Z and Y have the same meaning as above)] is used as the starting material the present compound of the general Formula I is prepared by reacting the compound of the general Formula IV with a compound of the general formula

(VI)

(wherein $R_1$ and $R_2$ have the same meaning as above).

The compound of the general Formula IV is prepared by reacting a compound of the Formula III with a compound of the general formula $$X—Z—Y \quad (VII)$$

(wherein Z and Y have the same meaning as above and X stands for a halogen atom. X and Y may be same or different).

The reactions involved in the above mentioned processes are described below:

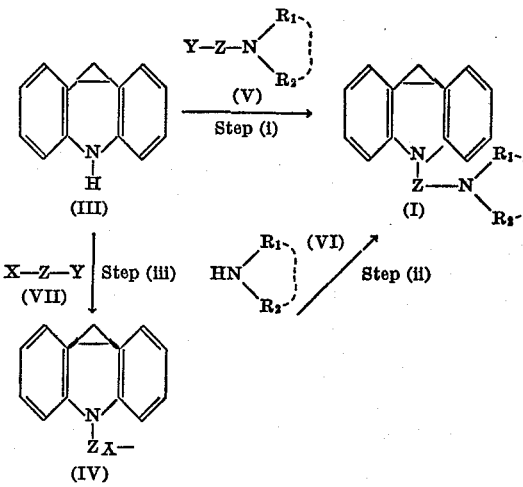

The following is the more detailed explanation of the respective steps.

The reaction of the step (i) is carried out in the presence of a suitable solvent. The solvent employable for this reaction includes, for example, toluene, dimethylformamide, dimethylsulfoxide, etc.

Upon conducting the reaction, use of a basic substance is desirable. Typical examples of the basic substance usable are alkali hydrides (e.g. sodium hydride, etc.), alkali amides (e.g. sodium amide, potassium amide, etc.), alkali alkoxides (e.g. sodium methoxide, sodium ethoxide, etc.), and alkali hydroxides (e.g. sodium hydroxide, potassium hydroxide, etc.).

The compound of the general Formula V may be applied to this reaction in a free form or in a form of a salt with an inorganic or organic acid. An amount of this compound to be used is practically about equal or a slight excess to a compound of the Formula III.

This reaction can proceed at room temperature, but preferably is conducted under heating. The object compound may be isolated by a usual method, for example, distillation, extraction, recrystallization, etc.

The reaction of the step (ii) is carried out in the absence or presence of a suitable organic solvent. The organic solvent employable includes, for example, alcohols (e.g. methanol, ethanol, and propanol), benzene, toluene, xylene, ethyl ether, chloroform, acetone, 2-butanone, ethyl acetate, etc. or a mixture of two or more thereof.

The reaction can proceed at room temperature, but preferably is conducted under heating around the boiling point of the solvent used. The use of a catalyst such as alkali iodides (e.g. sodium iodide, potassium iodide, etc.) is generally desirable for the reaction.

The compound of the general Formula VI also acts as an acceptor of a hydrogen halide which is generated by the reaction, and therefore it is preferable to use this compound in an excess amount to the compound of the general Formula IV. Preferable amount of the compound of the general Formula VI is generally about 2 to 4 moles per mole of the compound of the general Formula IV. However, when the compound of the general Formula VI is a lower member of aliphatic amines, such as ammonia and methylamine, it is desirable to use a large excess. The compound of the general Formula VI may be used in the form of free base or a salt with an acid. When the compound is used in a form of a salt, the reaction is preferably conducted in the presence of an alkaline substance (e.g. sodium hydroxide, potassium carbonate, etc.) so as to liberate the corresponding free base from the salt.

The reaction time is usually from about 4 to 24 hours. The object product may be isolated by a usual method, for example, extraction with a suitable organic solvent such as chloroform, ethanol, etc.

The reaction of the step (iii) is carried out preferably in the presence of an organic solvent and a basic substance as an acceptor of hydrogen halide generated by the reaction.

The organic solvent employable includes, for example, benzene, toluene, xylene, etc.

The basic substance preferably used varies with the kind of the compound X—Z—Y, that is to say, a tertiary amine (e.g. pyridine, methylpyridine, trimethylamine, triethylamine, etc.) is suitable for the compound of X—Z—Y wherein Z is CO, while an alkali amide (e.g. sodium amide, potassium amide, etc.) is suitable for the compound of X—Z—Y wherein Z is alkylene.

The basic substance is used in an about equal or a slight excess amount to the compound of the Formula III.

The reaction is preferably conducted at room temperature or under cooling when the compound of X—Z—Y wherein Z is —CO— is used, while the reaction is conducted by heating under reflux when the compound of X—Y—Z wherein Z is alkylene is used, and the reaction time is usually several hours.

The reaction product as such of this step may be subjected to the reaction of the step (ii) without isolation or purification, but if desired, it can be isolated and purified by a usual method, for example, distillation, chromatography, recrystallization, etc.

The object compound of the general Formula I is obtained in a form of free base, and the base may be, upon necessity, converted into a suitable acid salt after a conventional manner.

The compound of the Formula III, the starting material of this invention, is a novel compound and may be prepared by the steps described in the following schema.

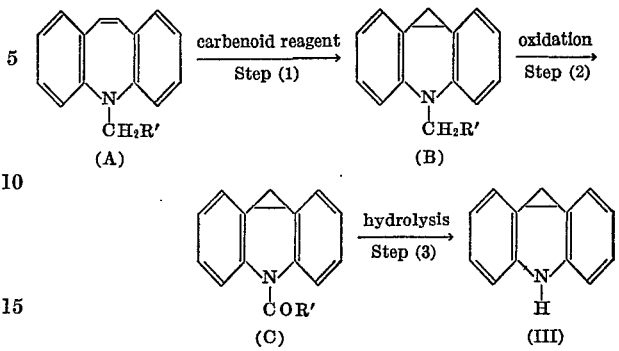

wherein R' stands for a hydrogen atom or an alkyl group).

As the alkyl group represented by the symbol R', lower alkyl groups having 1 to 4 carbon atoms (e.g. methyl, ethyl, propyl, isopropyl, butyl, isobutyl, etc.) are preferable.

Namely, the compound of the Formula III is prepared by at first subjecting a compound of the general Formula A to carbenoid reaction to form the compound of the general Formula B, followed by oxidation to produce the compound of the general Formula C, and finally subjecting the compound of the general Formula C to hydrolysis.

The reaction of the step (1) as carried out in the presence of an inert solvent. The said solvent includes, for example, ethers (e.g. ethyl ether, 1,2-dimethoxyethane, tetrahydrofuran, dioxane, etc.), benzene, toluene, ethyl acetate, chloroform, etc.

The reaction temperature is around the boiling point of the solvent used, but if desired, heating at higher than the boiling point may be applicable. The reagent to be reacted with the compound of the general Formula A in the carbenoid reaction of the step (1) is a halomethyl-metal compound or a reagent capable of forming methylene-metal complex as a reaction intermediate (see
(1) Yuki Gosei Kagaku Kyokai shi 24 519 (1966)
(2) Yuki Gosei Kagaku Kyokai shi 24 632 (1966)
(3) J. Am. Chem. Soc. 86 4042 (1964))

(hereinafter termed as "carbenoid reagent"). The act of the carbenoid reagent upon the compound of the general Formula A adds a methylene group to the double bond of the compound to form a cyclopropane ring.

Referring to the carbenoid reagent, the halomethyl-metal compound is exemplified by bisbromomethylmercury, and the reagent capable of forming methylene-metal complex as a reaction intermediate is exemplified by diazomethane-zinc halide, zinc-copper couple-dibromomethane, zinc-copper couple-diiodomethane, dialkylzinc-diiodomethane, diazomethane-dialkylaluminum halide, diiodomethane-trialkylaluminum, diiodomethane-dialkylcadmium, diazomethane-copper halide, etc., among which zinc-copper couple-dibromomethane and zinc-copper couple-diiodomethane are preferable.

An amount of the carbenoid reagent to be used is about one or more moles per mole of the compound of the general Formula A, preferably from about 4 to 10 moles, more preferably about 5 to 6 moles per mole of the compound of the general Formula A.

The compound of the general Formula B wherein R' is a hydrogen atom is also prepared by subjecting a compound of the general Formula D to the reaction with the carbenoid reagent;

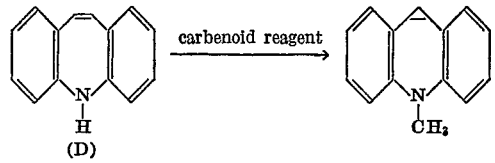

The reaction conditions for this process are similar to those of the step (1).

In the reaction of the step (2), a conventional oxidizing agent is employable, typical examples of which include, for example, permanganates (e.g. sodium, potassium barium, and calcium permanganate, etc.), ferricyanides (e.g. sodium and potassium ferricyanide, etc.), mercuric acetate, dichromates (e.g. sodium and potassium dichromate, etc.), nitric acid, etc.

Among them, permanganates such as potassium permanganate, barium permanganate and calcium permanganate are preferably used.

The reaction of the step (2) is carried out at a temperature below 30° C. preferably in the presence of a suitable solvent such as acetone, pyridine, or a mixture of any of these solvents and water.

The reaction of the step (3) is carried out at room temperature or under heating preferably in the presence of a suitable solvent and a basic substance. The solvent employable includes alcohols such as methanol, ethanol, butanol, ethyleneglycol and a mixture of any of these alcohols and water.

The above mentioned basic substance may be exemplified by hydroxide of alkali metals such as sodium hydroxide, potassium hydroxide and lithium hydroxide.

Owing to the effective psychotropic actions, the cyclopropadibenzazepine derivatives of the present invention may be used as such as an antidepressant, an anticonvulsant, an antiepileptic, an antihistaminic agent, an anti-Parkinsonian agent or a major-tranquilizer, or in the form of a pharmaceutically acceptable composition in admixture with a suitable and conventional carrier or adjuvant, administrable orally or by way of injection.

The pharmaceutical composition may take the form of tablets, granules, powders, capsules or injections and may be administered orally, subcutaneously or intramuscularly.

Usual daily doses of the derivatives lie in the range of about 10 to about 1,500 milligrams per human adult upon oral administration or about 2 to about 300 milligrams per human adult upon administration by way of injection.

For further explanation of the present invention, following examples and references are given wherein the word "part(s)" is based on weight unless otherwise noted, and the relation between "part" and "volume part" corresponds to that between gram and milliliter.

References—preparation of the starting material (1) To 250 volume parts of dioxane are added 10.4 parts of 5-methyl-5H-dibenz[b,f]azepine, 36.5 parts of pulverized zinc-copper couple containing 90% by weight of zinc, 107 parts of diiodomethane and 0.60 part of iodine, and then the whole mixture is boiled under reflux for 24 hours.

After cooling, to the resultant is added 250 volume parts of ethyl ether, and into the whole mixture is passed ammonia gas for 30 minutes. The resultant is subjected to filtration to remove the produced inorganic salt.

The salt thus obtained is washed four times with each 50 volume parts of ethyl ether.

The washings are combined with the above filtrate and the whole mixture is washed twice with each 100 volume parts of an aqueous solution of ammonia (1:1), then with each 50 volume parts of water four times and finally with 50 volume parts of a saturated aqueous solution of sodium chloride, followed by distillation to remove the solvent. This procedure gives 11.4 parts of crude product. The crude product is recrystallized twice from isopropyl ether to give pure 6-methyl-1,1a,6,10b-tetrahydrocyclopropa[d]dibenz[b,f]azepine in a yield of 41%. Melting point: 120–122° C.

*Elementary analysis.* Calculated for $C_{16}H_{15}N$ (percent): C, 86.84; H, 6.83; N, 6.33. Found (percent): C, 86.73; H, 6.57; N, 6.18.

(2) 14.4 parts of 6-methyl-1,1a,6,10b-tetrahydrocyclopropa[d]dibenz[b,f]azepine is dissolved in a mixture of 433 volume parts of acetone and 72 volume parts of water, and then to the solution is added slowly 61.9 parts of potassium permanganate under stirring and cooling below 30° C. over about 20 minutes.

The mixture is further stirred for 1 hour at room temperature, followed by adding slowly 35 parts of pulverized sodium thiosulfate pentahydrate so as to decompose excess potassium permanganate.

The produced manganese dioxide is removed by filtration and thus removed product is washed four times with 100 volume parts each of acetone.

The washings are combined with the filtrate, and the acetone is removed by distillation under reduced pressure.

The addition of 72 volume parts of water gives crystalline precipitates.

After washing with water, the crystals are recrystallized from ethanol to give 6-formyl-1,1a,6,10b-tetrahydrocyclopropa[d]dibenz[b,f]azepine melting at 169 to 170° C. Yield is 68%.

*Elementary analysis.*—Calculated for $C_{16}H_{13}NO$ (percent): C, 81.68; H, 5.57; N, 5.95. Found (percent): C, 81.37; H, 5.66; N, 5.76.

(3) To 115 volume parts of ethanol are added 5.0 parts of 6 - formyl - 1,1a,6,10b-tetrahydrocyclopropa[d]dibenz[b,f]-azepine and 56 volume parts of 20 weight percent aqueous potassium hydroxide solution. The resulting solution is mildly heated under reflux in nitrogen gas stream for 15 hours.

The solvent is distilled under reduced pressure to remove ethanol. To the residue is added 50 volume parts of water to give crystals as precipitates.

After washing with water, the crystals are recrystallized from ethanol to give 1,1a,6,10b - tetrahydrocyclopropa[d]dibenz[b,f]azepine melting at 119 to 120° C. Yield: 88%.

*Elementary analysis.*—Calculated for $C_{15}H_{13}N$ (percent): C, 86.92; H, 6.32; N, 6.76. Found (percent): C, 86.86; H, 6.41; N, 6.76.

(4) To a solution composed of 0.0188 part of cupric acetate monohydrate and 1.88 parts by volume of 95% (v./v.) hot aqueous acetic acid solution is added under stirring 1.31 parts of granular zinc.

After metallic copper completely deposits on the surface of zinc metal, the aqueous acetic acid solution is removed by decantation.

To the residue is added 1.88 volume parts of acetic acid under stirring, and then the acetic acid is removed by decantation. The same procedure as just above is repeated three times using each 1.88 volume parts of dry ethyl ether in place of acetic acid. The above procedure gives a zinc-copper couple containing about 99.5 mole percent of zinc and 0.5 mole percent of copper.

To the above zinc copper couple are added 0.482 part of 5H-dibenz[b,f]azepine, 5.35 parts of diiodomethane and 120 volume parts of dry dioxane, followed by heating under reflux for 75 minutes.

To the resultant is, after cooling, added 12 volume parts of ethyl ether, and into the whole mixture is passed ammonia gas for 30 minutes.

After removing the precipitates of an inorganic salt by filtration, the precipitates are washed four times with 5 volume parts each of ethyl ether.

The above filtrate is combined with the washings, and the mixture is washed with 5.5 volume parts of an aqueous ammonia solution (1:1), with 2 volume parts of the same solution, four times with each 5 volume parts of water and finally with 4 volume parts of a saturated aqueous sodium chloride solution. The resultant is dried over anhydrous sodium sulfate and subjected to distillation to remove the solvent.

This procedure gives 0.725 part of crude product as an oily substance. This product is recrystallized from isopropyl ether to obtain pure 6-methyl-1,1a,6,10b-tetrahydrocyclopropa[d]dibenz[b,f]azepine melting at 120 to 122° C.

*Elementary analysis.*—Calculated for $C_{16}H_{15}N$ (percent): C, 86.84; H, 6.83; N, 6.33. Found (percent): C, 86.73; H, 6.57; N, 6.18.

EXAMPLE 1

0.389 part of 49 weight percent sodium hydride is washed three times with 0.8 volume part each of ethyl ether, then is added to 8 volume parts of dimethylsulfoxide, followed by heating at 70° C. in nitrogen gas stream for 35 minutes to dissolve sodium hydride in the solvent.

To the prepared solution is added dropwise under stirring in nitrogen gas stream 0.828 part of 1,1a,6,10b-tetrahydrocyclopropa[d]dibenz[b,f]azepine and 0.972 part of 3-chloro-N,N-dimethylpropylamine in 8.2 volume parts of dimethylsulfoxide, whereby an exothermic reaction proceeds.

The reaction mixture is heated at 120° C. for 15 minutes and, after cooling, is poured into 20 volume parts of ice water.

The resultant is subjected to extracton twice with each 20 volume parts of ethyl ether. The ether layer is washed three times with each 10 volume parts of water, and then the basic substance dissolved in the ether layer is transferred to 6 volume parts of 1 N hydrochloric acid.

The hydrochloric acid solution is washed with 2 volume parts of ethyl ether and to the solution is added 0.7 volume part of a 40 weight percent aqueous sodium hydroxide solution to precipitate out an amine.

The amine is subjected to extraction with 20 volume parts of ethyl ether, and the ether extract is washed three times with each 10 volume parts of water and then with 10 volume parts of a saturated aqueous sodium chloride solution.

The ether extract is subjected to distillation under reduced pressure to remove the solvent, whereby 1,072 parts of 6-[3-(dimethylamino)propyl] - 1,1a,6,10b - tetrahydrocyclopropa[d]dibenz[b,f]azepine is obtained as an oily substance. Yield: 92%.

12.8 volume parts of ethyl acetate containing 0.427 part of maleic acid is added to the said oily substance dissolved in 2.1 volume parts of ethyl acetate to separate out a crude maleic acid salt of the said substance.

The crude salt is collected by filtration and then recrystallized from ethanol to obtain a pure product melting at 159 to 160° C. Yield: 87%.

*Elementary analysis.*—Calculated for $C_{24}H_{28}N_2O_4$ (percent): C, 70.56; H, 6.91; N, 6.86. Found (percent): C, 70.29; H, 7.03; N, 6.61.

EXAMPLE 2

0.46 part of 1,1a,6,10b-tetrahydrocyclopropa[d]-dibenz[b,f]azepine and 0.176 part of pyridine are dissolved in 5 volume parts of benzene and to the solution is passed phosgene gas under cooling with water until enlargement of a spot due to the reaction product is not observed any longer by thin-layer chromatography. The resultant is subjected to filtration to remove pyridine hydrochloride, followed by distillation under reduced pressure at room temperature to remove the solvent.

This procedure gives 1,1a,6,10b-tetrahydrocyclopropa[d]dibenz[b,f]azepine-6-carbonyl chloride. Significant maximum absorption in infrared spectrum: 1745 cm.$^{-1}$ (due to carbonyl group).

To this product is added 10 volume parts of a 10 weight percent ethanolic ammonia solution, and the whole mixture is heated under reflux for 4 years.

After removing the solvent by evaporation the resultant is extracted five times with chloroform of 17 volume parts in total.

The chloroform extract is subjected to distillation to remove the solvent and the residue is recrystallized twice from ethanol to obtain 0.296 part of pure crystals of 1,1a,6,10b - tetrahydrocyclopropa[d]dibenz[b,f]azepine-6-carboxamide melting at 209 to 211° C. Yield: 53%.

*Elementary analysis.*—Calculated for $C_{16}H_{14}N_2O$ (percent): C, 76.78; H, 5.64; N, 11.19. Found (percent): C, 76.10; H, 5.40; N, 10.72.

EXAMPLE 3

1.036 parts of 1,1a,6,10b-tetrahydrocyclopropa[d] dibenz[b,f]azepine and 0.390 part of sodium amide are added to 20 volume parts of dry xylene, followed by boiling in nitrogen gas stream for 2 hours to give the corresponding sodium salt. To the reaction mixture is added 3.148 parts of 1-bromo-3-chloropropane, followed by heating under reflux for 7 hours. After cooling, the reaction mixture is poured into 20 volume parts of ice water, and the separated organic layer is collected. The organic layer is washed twice with each 10 volume parts of water and then with 10 volume parts of a saturated aqueous sodium chloride solution, and dried over anhydrous sodium sulfate, followed by distillation under reduced pressure to remove the solvent. This procedure gives 1.914 parts of a crude product. The crude product is subjected to chromatography on 52 parts of silica-gel using hexane-benzene (9:1 v./v.) as a solvent, followed by recrystallizing from ethanol to give crystals melting at 102 to 103° C. The crystals are so-called mixed crystals consisting of 6 to 8 mole parts of 6-(3-chloropropyl) - 1,1a,6,10b - tetrahydrocyclopropa[d]dibenz [b,f]azepine and 1 mole part of 6-(3-bromopropyl)-1,1a,6,10b-tetrahydrocyclopropa[d]dibenz[b,f]azepine.

| Elementary analysis | Percent | | | Halogen (μmole/mg.) |
| --- | --- | --- | --- | --- |
|  | C | H | N |  |
| Calculated for: |  |  |  |  |
| 6$C_{18}H_{18}NCl \cdot C_{18}H_{18}NBr$ | 74.50 | 6.25 | 4.83 | 3.45 |
| 7$C_{18}H_{18}NCl \cdot C_{18}H_{18}NBr$ | 74.71 | 6.27 | 4.84 | 3.46 |
| 8$C_{18}H_{18}NCl \cdot C_{18}H_{18}NBr$ | 74.87 | 6.28 | 4.85 | 3.46 |
| Found | 74.53 | 6.35 | 4.83 | 3.39 |

EXAMPLE 4

A mixture of 4 volume parts of 2-butanone, 0.284 part of the mixed crystals prepared in Example 3, 0.170 part of piperidine, 0.276 part of potassium carbonate and 0.150 part of sodium iodide is heated under reflux for 8.5 hours. The resultant is subjected to filtration to remove precipitates. The precipitates are washed three time with 2-butanone of 4 volume parts in total. The washings are combined with the above filtrate and the whole mixture is subjected to distillation under reduced pressure to remove 2-butanone. To the residue are added 20 volume parts of ethyl ether and 4 volume parts of water. The ether layer is collected and washed with 5 volume parts of water. To the ether layer is added 2.5 volume parts of 0.5 N hydrochloric acid to transfer the resultant in ether layer to the hydrochloric acid layer. The hydrochloric acid layer is collected and washed with 1 volume part of ethyl ether, and then treated with 0.5 volume part of a 10 weight percent aqueous sodium hydroxide solution. The resulting solution is subjected to extraction with 10 volume parts of ethyl ether, and the ether extract is washed with 5 volume parts of water and then with 5 volume parts of a saturated aqueous sodium chloride solution, followed by drying over anhydrous sodium sulfate and subjecting to distillation to remove the solvent. This procedure gives 0.240 part of 6-[3-(1-piperidyl)propyl]-1,1a,6,10b-tetrahydrocyclopropa[d]dibenz[b,f]azepine in a yield of 72%, which is then converted to the corresponding maleate after a conventional manner and recrystallized from ethanol. Melting point: 154 to 156° C.

*Elementary analysis.*—Calculated for $C_{27}H_{32}N_2O_4$ (percent): C, 72.29; H, 7.19; N, 6.25. Found (percent): C, 72.26; H, 7.21; N, 6.47.

EXAMPLE 5

6-[2-(dimethylamino)ethyl] - 1,1a,6,10b-tetrahydrocyclopropa[d]dibenz[b,f]azepine is produced as an oily substance in a yield of 59% from 1,1a,6,10b-tetrahydrocyclopropa[d]dibenz[b,f]azepine and 2-chloro-N,N-dimethylethylamine by a similar manner to Example 1. This compound is converted to the corresponding maleate after a conventional manner and recrystallized from ethanol. Melting point: 158 to 159° C.

*Elementary analysis.*—Calculated for $C_{23}H_{26}N_2O_4$ (percent): C, 70.03; H, 6.64; N, 7.10. Found (percent): C, 70.14; H, 6.79; N, 7.05.

EXAMPLE 6

After a similar manner to Example 1, 6-[2-(diethylamino)ethyl] - 1,1a,6,10b - tetrahydrocyclopropa[d]dibenz[b,f]azepine is obtained as an oily substance in a yield of 76% from 1,1a,6,10b-tetrahydrocyclopropa[d]dibenz[b,f]azepine and 2-chloro-N,N-diethylethylamine.

*Elementary analysis.*—Calculated for $C_{21}H_{26}N_2$ (percent): C, 82.31; H, 8.55; N, 9.14. Found (percent): C, 81.94; H, 8.51; N, 9.03.

EXAMPLE 7

To 30 volume parts of 2-butanone are added 0.5 part of the product obtained in Example 3, 0.46 part of N-2-hydroxyethylpiperazine and 0.264 part of sodium iodide, and the whole mixture is heated under reflux for 18 hours. The resultant is subjected to distillation to remove the solvent, and to the residue is added 30 volume parts of water. The whole mixture is subjected to extraction with chloroform, and the chloroform extract is dried over magnesium sulfate, followed by distillation to remove the solvent. This procedure gives an oily substance. The oily substance is then treated with 0.318 part of oxalic acid in ethyl ether, whereby there are produced crystals. The crystals are recrystallized from diluted methyl alcohol to give colorless fine crystals of 6-[3-[4-(2-hydroxyethyl)-1-piperazinyl]propyl]-1,1a,6,10b - tetrahydrocyclopropa[d]dibenz[b,f]azepine dioxalate melting at 215 to 216° C. (decomposition). Yield: 35.6%.

*Elementary analysis.*—Calculated for $C_{28}H_{35}N_3O_9$ (percent): C, 60.31; H, 6.33; N, 7.54. Found (percent): C, 60.13; H, 6.28; N, 7.56.

EXAMPLE 8

To 30 volume parts of 2-butanone are added 0.5 part of the product obtained in Example 3, 0.353 part of N-methylpiperazine and 0.264 part of sodium iodide, and the whole mixture is heated under reflux for 10 hours. To the resultant is added 30 volume parts of water. The separated organic layer is dried over magnesium sulfate, followed by distillation to remove the solvent. This procedure gives an oily substance. The oily substance is treated with 0.318 part of oxalic acid in ethyl ether to give crystals, which are recrystallized from 90% ethyl alcohol to give colorless fine crystals of 6-[3-(4-methyl-1-piperazinyl)propyl] - 1,1a,6,10b-tetrahydrocyclopropa[d]dibenz[b,f]azepine dioxalate melting at 224 to 225° C. (decomposition). Yield: 47.3%.

*Elementary analysis.*—Calculated for $C_{27}H_{33}N_3O_8$ (percent): C, 61.47; H, 6.31; N, 7.97. Found (percent): C, 61.92; H, 6.40; N, 7.71.

What we claim is:
1. A compound of the formula

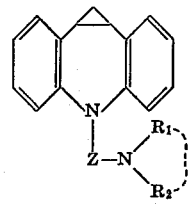

wherein Z is lower alkylene or carbonyl, each of $R_1$ and $R_2$ is hydrogen, alkyl having 1 to 4 carbon atoms, phenyl, naphthyl or tolyl, or $R_1$ and $R_2$ taken together with the adjacent nitrogen atom is 1-pyrrolidinyl, 1-piperidyl, morpholino, 1-piperazinyl or pharmaceutically acceptable acid addition salts of said compound.

2. A compound as claimed in claim 1, wherein Z is carbonyl.

3. A compound as claimed in claim 1, wherein Z is lower alkylene.

4. A compound of the formula

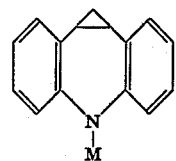

wherein M stands for hydrogen or a radical of Y, wherein Z stands for lower alkylene or carbonyl, Y stands for [b,f]azepine.

5. A compound as claimed in claim 1, wherein the compound is 6-[3-(dimethylamino)propyl]-1,1a,6,10b-tetrahydrocyclopropa[d]dibenz[b,f]azepine.

6. A compound as claimed in claim 1, wherein the compound is 1,1a,6,10b-tetrahydrocyclopropa[d]dibenz[b,f]azepine-6-carboxamide.

7. A compound as claimed in claim 4, wherein the compound is 1,1a,6,10b-tetrahydrocyclopropa[d]dibenz[b,f]azepine.

8. A compound as claimed in claim 4, wherein the compound is 1,1a,6,10b-tetrahydrocyclopropa[d]dibenz[b,f]azepine-6-carbonyl chloride.

References Cited
UNITED STATES PATENTS

| | | | |
|---|---|---|---|
| 3,036,064 | 5/1962 | Schindler | 260—239 |
| 3,025,288 | 2/1962 | Schindler | 260—239 |

ALTON D. ROLLINS, Primary Examiner

U.S. Cl. X.R.

260—247.1, 247.2 A, 247.5 B, 268 PC, 293.59, 326.3, 326.81; 424—244, 248, 250, 267, 274

UNITED STATES PATENT OFFICE
CERTIFICATE OF CORRECTION

Patent No. 3,679,662                    Dated July 25, 1972

Inventor(s) Katsura Morita et al.

It is certified that error appears in the above-identified patent and that said Letters Patent are hereby corrected as shown below:

Claim 4, lines 3 to 5, inclusive, should read "wherein M stands for hydrogen or a radical of Y-Z wherein Z stands for lower alkylene or carbonyl, Y stands for halogen."

Signed and sealed this 2nd day of January 1973.

(SEAL)
Attest:

EDWARD M. FLETCHER, JR.                 ROBERT GOTTSCHALK
Attesting Officer                       Commissioner of Patents